(12) United States Patent
Dunyon

(10) Patent No.: US 6,213,532 B1
(45) Date of Patent: Apr. 10, 2001

(54) SIDEWALL EXTENDER FOR A WHEELBARROW

(76) Inventor: La Mar H. Dunyon, 745 Harrison Rd., Burbank, WA (US) 99323

( * ) Notice: Subject to any disclaimer, the term of this patent is extended or adjusted under 35 U.S.C. 154(b) by 0 days.

(21) Appl. No.: 09/480,531

(22) Filed: Jan. 7, 2000

(51) Int. Cl.$^7$ .................................................. B62D 33/033
(52) U.S. Cl. ........................ 296/32; 280/47.3; 280/47.31; 280/653; 280/659; 296/36
(58) Field of Search ..................... 296/32, 36; 280/47.31, 280/47.3, 47.33, 653, 659, 652; 298/2, 3

(56) References Cited

U.S. PATENT DOCUMENTS

| D. 311,084 | * | 10/1990 | Batchelor | D34/27 |
|---|---|---|---|---|
| 2,423,311 | * | 7/1947 | Griffin . | |
| 2,480,534 | * | 8/1949 | Wohland . | |
| 2,676,054 | * | 4/1954 | Pasin . | |
| 2,768,022 | * | 10/1956 | Pope | 296/32 |
| 2,805,885 | * | 9/1957 | Elzea . | |
| 3,161,434 | * | 12/1964 | Jerpbak . | |
| 3,870,367 | * | 3/1975 | O'Brien | 298/1 B |
| 4,095,838 | * | 6/1978 | Beeler | 296/26 |
| 5,374,095 | * | 12/1994 | Ramseth | 296/32 |
| 5,806,866 | * | 9/1998 | Fleischer | 280/47.31 |
| 5,839,772 | * | 11/1998 | Toole | 296/32 |

FOREIGN PATENT DOCUMENTS

| 13505 | * | 7/1933 | (AU) | 296/32 |
|---|---|---|---|---|

* cited by examiner

Primary Examiner—D. Glenn Dayoan
Assistant Examiner—Mickki Murray

(57) ABSTRACT

A sidewall extender for a wheelbarrow for increasing the carrying capacity of the wheelbarrow. The sidewall extender for a wheelbarrow includes a flexible sheet of material having a length such that the sheet of material fastens to the side-walls and encloses about the bin and extends the side-walls to a height of approximately 3 feet with the sheet of material being made of canvas or some other type of vinyl; and further includes a plurality of fastening members securely attached along the first and second end edges and bottom edge of the sheet of material and also along top edges of the side-walls of the wheelbarrow for fastening the sheet of material to the wheelbarrow. The first and second end edges are fastened together when the sheet of material is secured to the wheelbarrow.

10 Claims, 2 Drawing Sheets

SIDEWALL EXTENDER FOR A WHEELBARROW

BACKGROUND OF THE INVENTION

1. Field of the Invention

The present invention relates to wrap around reversible sack for a wheelbarrow and more particularly pertains to a new sidewall extender for a wheelbarrow for increasing the carrying capacity of the wheelbarrow.

2. Description of the Prior Art

The use of wrap around reversible sack for a Wheelbarrow is known in the prior art. More specifically, wrap around reversible sack for a wheelbarrow heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,870,367; U.S. Pat. No. 3,768,022; U.S. Pat. No. 5,374,095; U.S. Pat. No. 5,839,772; U.S. Pat. No. Des. 311,084; and U.S. Pat. No. 2,805,885.

While these devices fulfill their respective, particular objectives and requirements, the aforementioned patents do not disclose a new sidewall extender for a wheelbarrow. The inventive device includes a wheelbarrow having a bin with side-walls; and also includes a flexible sheet of material having a length such that the sheet of material fastens to the side-walls and encloses about the bin and extends the side-walls to a height of approximately 3 feet with the sheet of material being made of canvas or some other type of vinyl; and further includes a plurality of fastening members securely attached along the first and second end edges and bottom edge of the sheet of material and also along top edges of the side-walls of the wheelbarrow for fastening the sheet of material to the wheelbarrow. The first and second end edges are fastened together when the sheet of material is secured to the wheelbarrow.

In these respects, the sidewall extender for a wheelbarrow according to the present invention substantially departs from the conventional concepts and designs of the prior art, and in so doing provides an apparatus primarily developed for the purpose of increasing the carrying capacity of the wheelbarrow.

SUMMARY OF THE INVENTION

In view of the foregoing disadvantages inherent in the known types of wrap around reversible sack for a wheelbarrow now present in the prior art, the present invention provides a new sidewall extender for a wheelbarrow construction wherein the same can be utilized for increasing the carrying capacity of the wheelbarrow.

The general purpose of the present invention, which will be described subsequently in greater detail, is to provide a new sidewall extender for a wheelbarrow which has many of the advantages of the wrap around reversible sack for a wheelbarrow mentioned heretofore and many novel features that result in a new sidewall extender for a wheelbarrow which is not anticipated, rendered obvious, suggested, or even implied by any of the prior art wrap around reversible sack for a wheelbarrow, either alone or in any combination thereof.

To attain this, the present invention generally comprises a flexible sheet of material having a length such that the sheet of material fastens to the side-walls and encloses about the bin and extends the side-walls to a height of approximately 3 feet with the sheet of material being made of canvas or some other type of vinyl; and further includes a plurality of fastening members securely attached along the first and second end edges and bottom edge of the sheet of material and also along top edges of the side-walls of the wheelbarrow for fastening the sheet of material to the wheelbarrow. The first and second end edges are fastened together when the sheet of material is secured to the wheelbarrow.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new sidewall extender for a wheelbarrow which has many of the advantages of the wrap around reversible sack for a wheelbarrow mentioned heretofore and many novel features that result in a new sidewall extender for a wheelbarrow which is not anticipated, rendered obvious, suggested, or even implied by any of the prior art wrap around reversible sack for a wheelbarrow, either alone or in any combination thereof.

It is another object of the present invention to provide a new sidewall extender for a wheelbarrow which may be easily and efficiently manufactured and marketed.

It is a further object of the present invention to provide a new sidewall extender for a wheelbarrow which is of a durable and reliable construction.

An even further object of the present invention is to provide a new sidewall extender for a wheelbarrow which is susceptible of a low cost of manufacture with regard to both materials and labor, and which accordingly is then susceptible of low prices of sale to the consuming public, thereby making such sidewall extender for a wheelbarrow economically available to the buying public.

Still yet another object of the present invention is to provide a new sidewall extender for a wheelbarrow which provides in the apparatuses and methods of the prior art some of the advantages thereof, while simultaneously overcoming some of the disadvantages normally associated therewith.

Still another object of the present invention is to provide a new sidewall extender for a wheelbarrow for increasing the carrying capacity of the wheelbarrow.

Yet another object of the present invention is to provide a new sidewall extender for a wheelbarrow which includes a flexible sheet of material having a length such that the sheet of material fastens to the side-walls and encloses about the bin and extends the side-walls to a height of approximately 3 feet with the sheet of material being made of canvas or some other type of vinyl; and further includes a plurality of fastening members securely attached along the first and second end edges and bottom edge of the sheet of material and also along top edges of the side-walls of the wheelbarrow for fastening the sheet of material to the wheelbarrow. The first and second end edges are fastened together when the sheet of material is secured to the wheelbarrow.

Still yet another object of the present invention is to provide a new sidewall extender for a wheelbarrow that is convenient and easily attached to a wheelbarrow.

Even still another object of the present invention is to provide a new sidewall extender for a wheelbarrow that increases the usefulness of a wheelbarrow by quickly converting the wheelbarrow to one having a greater carrying capacity.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
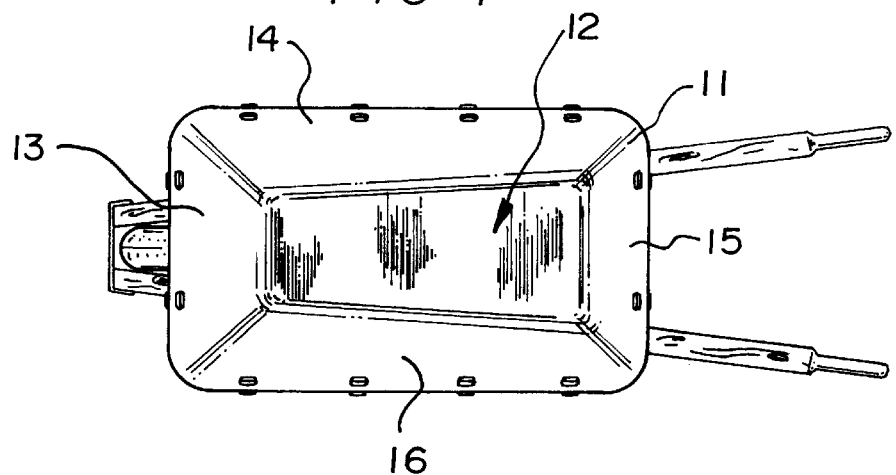
FIG. 1 is a to plan view of a new sidewall extender for a wheelbarrow according to the present invention.
Figure 2:
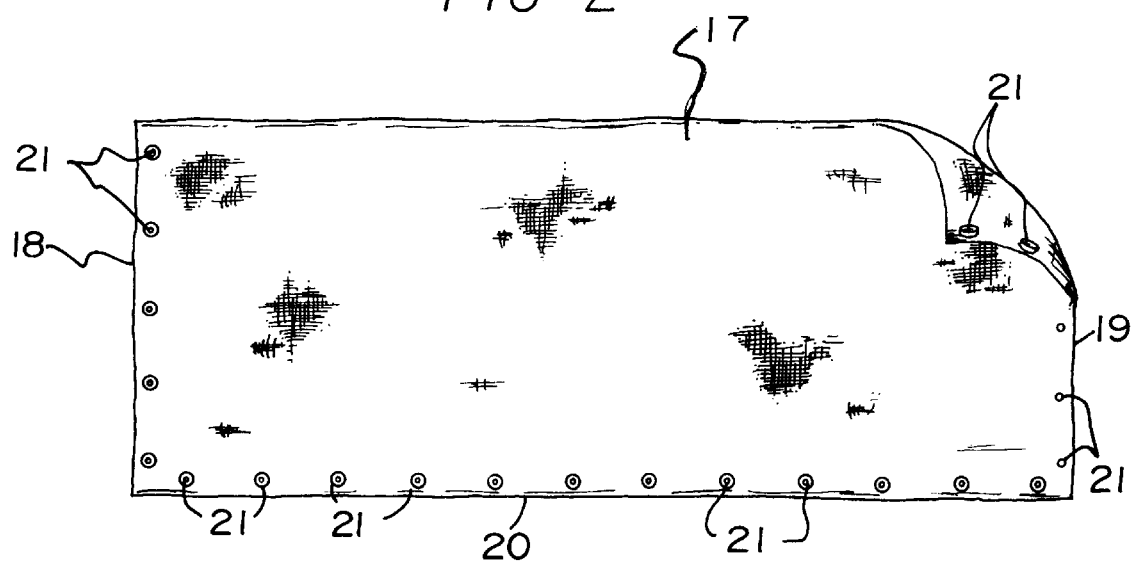
FIG. 2 is a side elevational view of the flexible sheet of material of the present invention.
Figure 3:
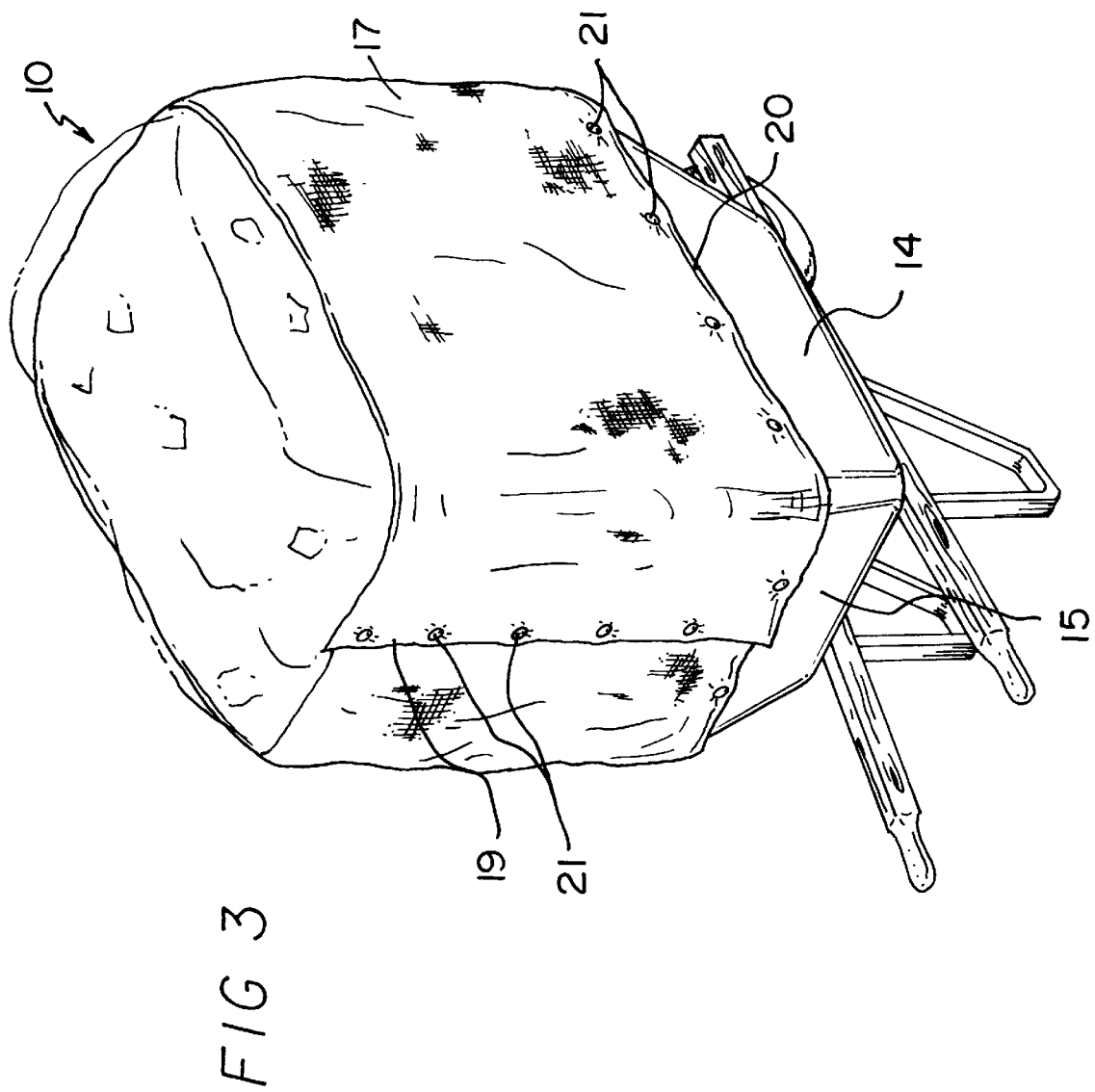
FIG. 3 is a perspective view of the present invention.

With reference now to the drawings, and in particular to FIGS. 1 through 3 thereof, a new sidewall extender for a wheelbarrow embodying the principles and concepts of the present invention and generally designated by the reference numeral 10 will be described.

As best illustrated in FIGS. 1 through 3, the sidewall extender for a wheelbarrow 10 generally comprises a wheelbarrow 11 having a bin 12 with side-walls 13–16, and further comprises a flexible sheet of material 17 having a length and a height and having opposed ends and being fastenable to the side-walls 13–16 of the wheelbarrow 11. The flexible sheet of material 17 has a length which is adapted to enclose about the bin 12 of the wheelbarrow 11. The opposed ends of the flexible sheet of material 17 are fastened together when the flexible sheet of material 17 is fastened about the bin 12 of the wheelbarrow 11. The flexible sheet of material 17 includes a bottom edge 20 and a first 18 and second 19 end edges. The flexible sheet of material 17 extends upwardly from the side-walls 13–16 of the wheelbarrow 11 when the flexible sheet of material 17 is fastened to the side-walls 13–16. The flexible sheet of material 17 has a height of approximately 3 feet with the flexible sheet of material 17 being essentially made of canvas and vinyl. A plurality of fastening members 21 are securely and conventionally attached to the side-walls 13–16 of the wheelbarrow 11 and to the flexible sheet of material 17. A plurality of the fastening members 21 are securely attached along the bottom edge 20 and the first and second end edges 18,19 of the flexible sheet of material 17, and a plurality of the fastening members 21 are securely attached along top edges of the side-walls 13–16 of the wheelbarrow 11. The fastening members 21 along the bottom edge 20 of the flexible sheet of material 17 are conventionally fastened to the fastening members 21 securely attached to outsides of the side-walls 13–16 of the wheelbarrow 11. The fastening members 21 include snap-on members having a plurality of mating snap-on members.

In use, the user fastens the snap-on members 21 along the bottom edge 20 of the flexible sheet of material 17 to the snap-on members 21 on the wheelbarrow 11 and also fastens the snap-on members 21 along the first and second end edges 18,19 together to essentially form side-walls which extend higher than the side-walls 13–16 of the wheelbarrow 11. The user can fill the bin 12 including the space inside the sheet of material 17 with lightweight materials such as leaves.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A side-wall extender system for a wheelbarrow comprising:

a wheelbarrow having a bin having side-walls;

a flexible sheet of material having a length and a height and having opposed ends and being fastenable to said side-walls of said wheelbarrow;

a plurality of fastening members being securely attached to said side-walls of said wheelbarrow and to said flexible sheet of material;

a plurality of said fastening members are securely attached along said bottom edge and said first and second end edges of said flexible sheet of material;

a plurality of said fastening members are securely attached along top edges of said side-walls of said wheelbarrow, wherein said fastening members along said bottom edge of said flexible sheet of material are fastened to said fastening members that are securely attached to outsides of said side-walls of said wheelbarrow; and wherein said fastening members include snap-on members having a plurality of mating snap-on members.

2. A wheelbarrow system as described in claim 1, wherein said flexible sheet of material has a length which is adapted to enclose about said bin of said wheelbarrow.

3. A side-wall extender for a wheelbarrow as described in claim 1, wherein said opposed ends of said flexible sheet of material are fastened together when said flexible sheet of material is fastened about said bin of said wheel barrow.

4. A side-wall extender for a wheelbarrow as described in claim 1, wherein said flexible sheet of material includes a bottom edge and a first and second end edges.

5. A side-wall extender for a wheelbarrow as described in claim 1, wherein said flexible sheet of material extends upwardly from said side-walls of said wheelbarrow when said flexible sheet of material is fastened to said side-walls.

6. A side-wall extender for a wheelbarrow as described in claim 1, wherein said flexible sheet of material has a height of approximately 3 feet.

7. A side-wall extender for a wheelbarrow as described in claim 1, wherein said flexible sheet of material is essentially made of canvas.

8. A side-wall extender for a wheelbarrow as described in claim 1, wherein said flexible sheet of material is essentially made of vinyl.

9. A wheelbarrow system comprising:

a wheelbarrow having a bin having side-walls;

a flexible sheet of material having a length and a width and having opposed ends and being fastenable to said side-walls of said wheelbarrow, said flexible sheet of material having a length which is adapted to enclose about said bin of said wheelbarrow, said opposed ends of said flexible sheet of material being fastened together when said flexible sheet of material is fastened about said bin of said wheel barrow, said flexible sheet of material including a bottom edge and a first and second end edges, said flexible sheet of material extending upwardly from said side-walls of said wheelbarrow when said flexible sheet of material is fastened to said side-walls, said flexible sheet of material having a height of approximately 3 feet, said flexible sheet of material being essentially made of canvas and vinyl; and a plurality of fastening members securely attached to said side-walls of said wheelbarrow and to said flexible sheet of material, a plurality of said fastening members being securely attached along said bottom edge and said first and second end edges of said flexible sheet of material, a plurality of said fastening members being securely attached along top edges of said side-walls of said wheelbarrow, said fastening members along said bottom edge of said flexible sheet of material being fastened to said fastening members securely attached to outsides of said side-walls of said wheelbarrow, said fastening members including snap-on members having a plurality of mating snap-on members.

10. A side-wall extender system for a wheelbarrow comprising:

a wheelbarrow having a bin having side-walls;

a flexible sheet of material having a length and a height and having opposed ends and being fastenable to said sidewalls of said wheelbarrow;

a plurality of fastening members securely attached to said side-walls of said wheelbarrow and to said flexible sheet of material;

wherein said flexible sheet of material has a length which is adapted to enclose about said bin of said wheelbarrow;

wherein said opposed ends of said flexible sheet of material are fastened together when said flexible sheet of material is fastened about said bin of said wheel barrow;

wherein said flexible sheet of material includes a bottom edge and a first and second end edges;

wherein said flexible sheet of material extends upwardly from said side-walls of said wheelbarrow when said flexible sheet of material is fastened to said side-walls;

a plurality of said fastening members being securely attached along said bottom edge and said first and second end edges of said flexible sheet of material;

a plurality of said fastening members being securely attached along top edges of said side-walls of said wheelbarrow;

wherein said fastening members along said bottom edge of said flexible sheet of material are fastened to said fastening members that are securely attached to outsides of said side-walls of said wheelbarrow; and wherein said fastening members include snap-on members having a plurality of mating snap-on members.

\* \* \* \* \*